(12) United States Patent
Clinch et al.

(10) Patent No.: US 7,765,672 B2
(45) Date of Patent: Aug. 3, 2010

(54) METHOD FOR ANCHORING A JOINING ELEMENT IN AN OBJECT

(75) Inventors: Colin Clinch, Basingstoke (GB); Marcel Aeschlimann, Ligerz (CH); Mario Lehmann, Les Pommerats (CH); Laurent Torriani, Lamboing (CH)

(73) Assignee: Woodwelding AG, Zug (CH)

( * ) Notice: Subject to any disclaimer, the term of this patent is extended or adjusted under 35 U.S.C. 154(b) by 224 days.

(21) Appl. No.: 11/962,292

(22) Filed: Dec. 21, 2007

(65) Prior Publication Data

US 2008/0199249 A1 Aug. 21, 2008

Related U.S. Application Data

(60) Provisional application No. 60/882,248, filed on Dec. 28, 2006.

(51) Int. Cl.
*B21D 39/00* (2006.01)
*F16B 4/00* (2006.01)

(52) U.S. Cl. .................... 29/520; 403/280

(58) Field of Classification Search ............ 29/520, 29/505, 507, 512, 523, 525, 525.03, 525.04, 29/525.05, 525.07, 525.13, 407.07; 156/73.1, 156/73.5, 298, 303.1, 306.6, 309.6, 73.6, 156/92; 411/501, 487, 506, 900, 908; 403/280; 52/745.21

See application file for complete search history.

(56) References Cited

U.S. PATENT DOCUMENTS 6,913,666 B1 * 7/2005 Aeschlimann et al. ..... 156/73.1
7,160,465 B2 * 1/2007 Kirts et al. ................. 210/681

* cited by examiner

*Primary Examiner*—John C Hong
(74) *Attorney, Agent, or Firm*—Rankin, Hill & Clark LLP (57) ABSTRACT

A joining element to be anchored in an object (10) with the aid of a thermoplastic material and mechanical vibration comprises a sealing portion (3.1) and a wall anchoring portion (3.2). The sealing portion (3.1) is substantially cylindrical and has a smooth circumferential surface. The wall anchoring portion (3.2) has a circumferential surface which comprises the thermoplastic material and energy directors. A cross section of the sealing portion (3.1) envelops the cross section (including energy directors) of the wall anchoring portion and is arranged adjoining to the latter on its proximal side. The joining element is anchored in an opening (5) provided in the object (10) wherein a cross section of the opening corresponds to the cross section of the sealing portion (3.1) of the joining element such that the latter can be forced into a mouth (5.1) of the opening (5) resulting in a press fit. For anchoring the joining element in the opening (5), mechanical vibrations e.g. ultrasonic vibrations are coupled into the joining element and the latter is forced into the opening (5) until at least a distal part of the sealing portion (3.1) is positioned within the opening. Thereby, the thermoplastic material of the circumferential surface of the wall anchoring portion (3.2) is liquefied and pressed into the opening wall, wherein the sealing portion (3.1) prevents the liquefied material to penetrate through the mouth and therefore the mouth (5.1) remains clear cut, i.e. does not get blurred by the liquefied material.

18 Claims, 3 Drawing Sheets

METHOD FOR ANCHORING A JOINING ELEMENT IN AN OBJECT

BACKGROUND OF THE INVENTION

The invention concerns a method for anchoring a joining element in an object and a joining element to be used in the method. The joining element comprises a thermoplastic material (or a material having a thermoplastic component) and anchoring is effected with the aid of the thermoplastic material and mechanical vibration (e.g. ultrasonic vibration) through which the thermoplastic material is at least locally liquefied. The joining element serves for connecting a further object to the named object in which it is anchored or the joining element is part of such further object.

It is known from the publications WO 98/42988 and WO 00/79137, to anchor joining elements in objects with the aid of a thermoplastic material which is liquefied by mechanical vibration, and which, in the liquefied state, is pressed into suitable surface structures in the object, where on re-solidification it forms a positive fit connection with the named surface structures and therewith anchors the joining element in the object. The material of the object in which the joining element is to be anchored possesses e.g. an open porosity or the surface of the object in a region where anchorage is to be affected comprises a plurality of corresponding cavities or protrusions. The thermoplastic material of the joining element usually has an elasticity module which is greater than 0.5 GPa and therefore this material can be liquefied by mechanical vibration only if contact with the object is limited to a plurality of small locations (energy directors). This is achieved e.g. by providing energy directors in the form of elements protruding from a main surface of the joining element which protruding elements taper to an edge or tip.

In many cases in which a joining element is anchored in an object with the aid of a thermoplastic material and mechanical vibration, an opening is provided in the object and it is desired that the joining element is anchored either in the walls of the opening or in the walls and in the bottom of the opening. Anchorage in the walls of the opening is achieved usually by dimensioning the joining element and the opening such that the circumference of a cross section of the joining element including energy directors is somewhat larger than the corresponding circumference of the cross section of the opening, such that on introducing the joining element into the opening, the circumference of the joining element is at least locally (energy directors) pressed against the wall of the opening.

In particular, if anchorage in the walls of the opening is desired in the immediate vicinity of the mouth of the opening, it often happens that the liquefied material interpenetrates the surface of the object in the vicinity of the opening and small amounts of the material protrude onto this surface. This effect blurs the contours of the opening and/or of the joining element in the mouth region such that these contours do not appear as clear cut as this may be desired for various reasons. In particular, if a proximal face of the joining element, which is anchored in an opening provided in the object, is to be flush with the object surface it is desirable mainly for esthetic reasons that the circumference of the joining element and of the opening are clearly defined, i.e. not blurred at all.

Anchorage in the immediate vicinity of the mouth of the opening is in many cases desired and it is necessary, if the object is very thin or if the opening is very shallow. This is the case if the object is a sandwich board with thin outer layers and an inner layer, wherein anchorage is possible only in the outer layers. An example of such a board is a so called hollow core board comprising outer layers of wood or a wood-like material and an inner layer being constituted by a honeycomb structure of cardboard, in which the named anchorage is not possible.

BRIEF SUMMARY OF THE INVENTION

It is an object of the invention to create a method for anchoring a joining element in an object and a joining element to be used in the method, wherein for anchoring the joining element, an opening is provided in the object, wherein the joining element comprises a thermoplastic material (or a material having a thermoplastic component) and anchorage is achieved by liquefaction of the thermoplastic material through mechanical vibration being applied to the joining element when it is forced into the opening. The anchoring method and the joining element according to the invention are to enable anchorage of the joining element in the wall of the opening, in particular in the immediate vicinity of a mouth of the opening wherein the contours of the mouth and the joining element at the level of the mouth are to remain as clear cut when the joining element is anchored as before anchoring.

This object is achieved by the anchoring method and the joining element as defined in the corresponding independent claims. Preferred embodiments are defined in the dependent claims.

For anchoring the joining element in a substantially cylindrical or slightly conical wall (having a round or non-round cross section) of an opening in the object, which wall extends away from the mouth of the opening, the joining element comprises a substantially cylindrical or slightly conical wall anchorage portion which is adapted regarding form and size to the named wall and whose circumferential surface comprises the thermoplastic material and is equipped with energy directors, i.e. with ribs and/or bumps which taper towards the outside in more or less sharp edges or tips. For anchorage, this wall anchorage region, whose cross section is slightly larger than the cross section of the mouth and opening wall is forced through the mouth by applying mechanical vibration (e.g. ultrasonic vibration) to a proximal end of the joining element and at the same time forcing the wall anchoring portion of the joining element through the mouth of the opening. Thereby the thermoplastic material of the circumferential surface of the wall anchoring portion is at least partly liquefied and is pressed into pores, unevenesses or specifically provided cavities of the walls and on re-solidification anchors the joining element therein.

For preventing the liquefied material from protruding through the mouth of the opening on to the surface of the object in which the opening is provided, a sealing means is forced through the mouth immediately following the wall anchoring portion of the joining element, the sealing means being again substantially cylindrical or slightly conical and having a cross section which corresponds in form to the cross section of the mouth of the opening but is slightly larger in cross section than the latter such that it needs to be forced into the mouth and effects sealing by a press-fit. The circumferential surface of the sealing means is smooth for effective sealing and, if the sealing means consists of the thermoplastic material, for preventing liquefaction thereof (no energy directors).

As mentioned above, the cross section of the sealing means has the same form as the cross section of the mouth and is on all sides slightly larger than the latter by about 0.1 to 1 mm. Furthermore, the cross section of the sealing means envelopes the cross section of the wall anchoring portion of the joining element, i.e. the edges and tips of the energy directors provided on the circumferential surface of the wall anchoring portion have the same distances from a joining element axis as the corresponding part of the circumferential surface of the sealing means.

In a preferred embodiment of the joining element according to the invention, the sealing means is part of the joining element, i.e. it is arranged adjoining the wall anchoring portion on the proximal side thereof, either directly or with a narrow groove therebetween, the groove region having a smaller cross section than the sealing means. However, the sealing means may also be constituted by the distal end of a tool which is applied to the proximal end of the joining element for coupling vibration and force into the joining element.

A joining element to be used in the method according to the invention comprises a thermoplastic material, preferably with a modulus of elasticity of more than 0.5 GPa. The joining element further comprises a substantially cylindrical wall anchoring portion between a distal end and a proximal end distanced from each other along a joining element axis. The joining element is dimensioned such that, on the anchored joining element, the wall anchoring portion is situated inside of the moth of the opening. The region of the proximal end comprises a contact face suitable for being contacted with a vibrating tool (e.g. a sonotrode of an ultrasonic device), which contact face advantageously extends perpendicular to the joining element axis. The thermoplastic material forms at least part of the circumferential surface of the joining element in the wall anchoring portion. The distance between the distal end of the joining element and the proximal end of its wall anchoring portion substantially defines a depth to which the joining element is to be introduced and anchored in the opening.

A preferred embodiment of the joining element to be used in the method according to the invention also comprises the sealing means which, as a sealing portion, is arranged coaxially adjoining the wall anchoring portion at its proximal side, the cross section of the sealing portion enveloping the cross section of the wall anchoring portion, wherein the circumferential surface of the sealing portion is smooth and the circumferential surface of the wall anchoring portion comprises a plurality of recesses forming between them a plurality of energy concentrating elements, i.e. a plurality of rib- or hump-shaped elements tapering off to edges or tips. The smooth circumferential surface of the sealing portion and the recess containing surface of the wall anchoring portion meet along a border line or narrow border groove running around the circumference of the joining element, which border line or groove is adapted to the shape of the surface of the object in which the opening is provided. For instance, if the named object surface is even and the opening extends substantially perpendicular to this surface, the border line extends in a plane which is perpendicular to the joining element axis.

The joining element is forced into the mouth of the opening provided in the object until the sealing portion has passed the mouth and is situated at a distance from the mouth of at least 0.5 mm preferably of at least 1 mm.

The sealing portion of the joining element or even the whole joining element may consists of the thermoplastic material. The smooth circumferential surface of the sealing portion which is in contact with the wall of the opening in the anchoring process does not enable liquefaction because there are no places where the vibrating energy is concentrated. However, it is possible also to use non-thermoplastic materials or thermoplastic materials melting at much higher temperatures or metals for the sealing portion and also for a core region of the joining element.

The wall anchoring portion of the joining element may continue to the distal end thereof. Alternatively, the joining element may further comprise a distal end region adjoining the wall anchoring portion on its distal side and having another shape and/or surface than the latter, wherein this distal end region, for being able to pass through the mouth of the opening, has a smaller cross section than the wall anchoring portion. The sealing portion of the joining element may form the proximal end of the joining element. Alternatively, the joining element may further comprise a proximal end region adjoining the sealing portion and having another shape and/or surface than the latter, wherein this proximal end region may have a larger or smaller cross section than the sealing portion.

If the joining element is to be anchored in the opening with its proximal face flush with the object surface in which the mouth of the opening is situated, then the sealing portion has a small axial length and carries the proximal contact face. In such cases, the axial extent of the sealing portion, i.e. the distance between the above defined border line and the proximal face is preferably at least 0.5 mm, preferably at least 1 mm.

It is possible also that in the method according to the invention the sealing function is taken over by a distal end region of a tool used for pressing the joining element into the opening provided in the object and for coupling the mechanical vibration into the joining element. In such cases, the wall anchoring portion of the joining element forms its proximal end and is forced with the tool to just below the mouth of the opening in the object.

BRIEF DESCRIPTION OF THE DRAWINGS

The method for anchoring the joining element in the object and a plurality of exemplary embodiments of the joining element according to the invention are described in detail in connection with the following figures.

DETAILED DESCRIPTION OF THE INVENTION

Figure 1A:
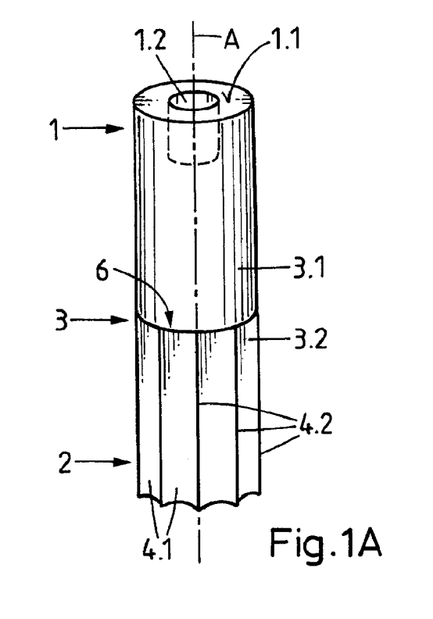
FIG. 1A is a perspective view of the joining element.
Figure 1B:
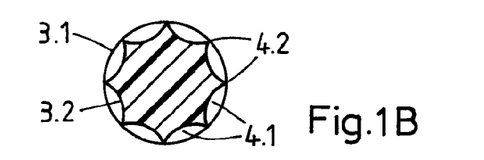
FIG. 1B is a cross sectional plan view through a wall anchoring region.
Figure 1C:
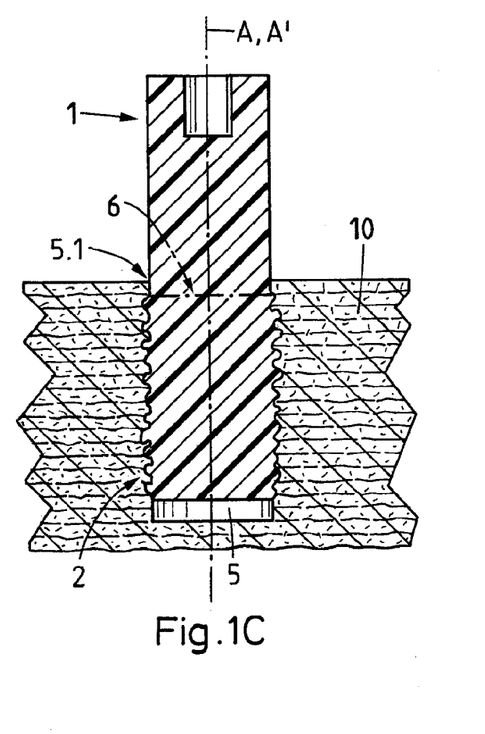
FIG. 1C is an elevation view illustrating the joining element being anchored in an opening provided in the object.
Figure 1D:
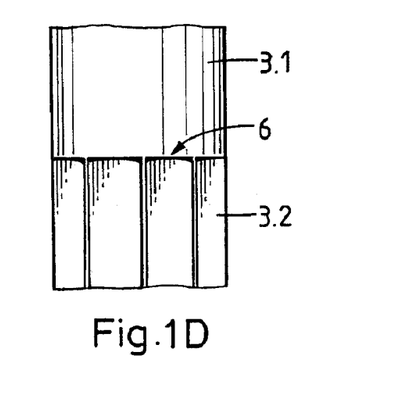
FIG. 1D is an elevation view illustrating detail of a proximal end of the wall anchoring region.
Figure 1E:
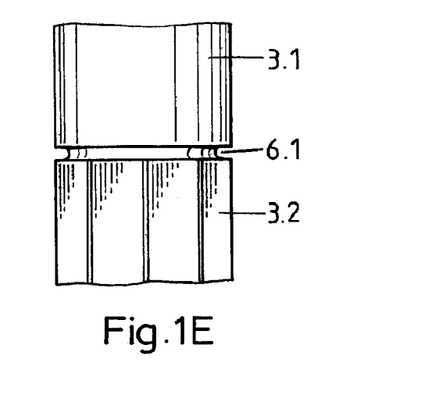
FIG. 1E is an elevation view illustrating detail of the proximal end of the wall anchoring region.

FIGS. 1A to 1C illustrate a first exemplary embodiment of a joining element according to the invention. Furthermore, FIGS. 1D and 1E show two different embodiments of a proximal end of a wall anchoring portion of the joining element.

The joining element consists fully of the thermoplastic material and comprises a proximal end 1 and a distal end 2, wherein the proximal end 1 and the distal end 2 are distanced from each other along a joining element axis A. Between the proximal end 1 and distal end 2, the joining element comprises a mouth region 3, which is the region where a sealing portion 3.1 and a wall anchoring portion 3.2 meet. The mouth region 3 is substantially cylindrical or slightly conical and has a cross section, as shown in FIG. 1B as substantially round. The proximal end 1 comprises a contact face 1.1 suitable for applying a tool for coupling mechanical vibration and a force in the direction of the joining element axis A into the joining element. The proximal end 1 may also comprise means for attaching the joining element to the tool or for guiding the tool, e.g. an axial recess 1.2. The distal end 2 is adapted to the opening in which it is to be anchored, the opening 5 provided in the object 10 being e.g. a blind bore.

The circumferential surface of the sealing portion 3.1 is smooth. The circumferential surface of the wall anchoring portion 3.2 comprises a plurality of recesses 4.1 (e.g. in a regular pattern) and between recesses 4.1, a plurality of energy concentrating elements 4.2 in the form of axial ribs 4 tapering off to more or less sharp edges, which have similar distances from the joining element axis A as the smooth circumferential surface of the sealing portion 3.1. This means that the cross section of the sealing portion 3.1 envelopes the cross section of the wall anchoring portion 3.2 (including energy concentrating elements) as illustrated in FIG. 1B, which is a cross section through the wall anchoring portion 3.2 viewed towards the sealing portion 3.2. The sealing portion 3.1 and the wall anchoring portion 3.2 meet in a mouth region 3 of the joining element along a border line 6, which lies in a plane perpendicular to the joining element axis A.

For anchoring the joining element according to FIGS. 1A and 1B, the blind bore (opening 5) is provided in the board 10, wherein a bore axis A' is oriented substantially perpendicular to the surface of the board 10 and wherein, of the bore 5, at least the mouth 5.1 and a piece of the wall extending away from the mouth 5.1 have a cross section which regarding form is adapted to the cross section of the sealing portion 3.1 of the joining element, but is slightly smaller than the latter (difference between diameters preferably between 0.2 and 2 mm). If the joining element is to be anchored not only in the bore walls but also in the bottom of the bore 5, the depth of the bore 5 is smaller than the distance between the distal end of the joining element and the border line 6.

For being anchored in the opening 5, the joining element is positioned in or on the mouth 5.1 of the opening 5 and using a suitable tool (e.g. the sonotrode of an ultrasonic device) which is positioned on and pressed against the contact face 1.1 of the joining element, the joining element is forced into the opening 5 while being vibrated. The ribs (energy concentrating elements 4.2) are pressed against the wall of the opening 5 and the thermoplastic material is liquefied there and is pressed into the porous structure of these walls. When the wall anchoring portion 3.2 and the border line 6 have passed the mouth 5.1 the distal end of the sealing portion 3.1, which is not equipped with energy concentrating elements (smooth circumferential surface) is forced into the mouth 5.1 wherein, because of the lack of energy directors, hardly any material is liquefied such that this sealing portion 3.1 is able to seal the mouth 5.1 in a clean manner as illustrated in FIG. 1C. The border line 6 which is shown in FIG. 1C as a dash-dotted line is in reality hardly distinguishable after the anchoring process.

As shown in FIGS. 1D and 1E, the border line 6 may be a sharp line as illustrated in FIG. 1D, or it may be a narrow grove (border groove 6.1) extending between the sealing portion 3.1 and the wall anchoring portion 3.2 and serving for accommodating a surplus of liquefied material.

Possible alternative features of the joining element and the anchoring method as illustrated in FIGS. 1A to 1E are listed hereinbelow.

Figure 2A:
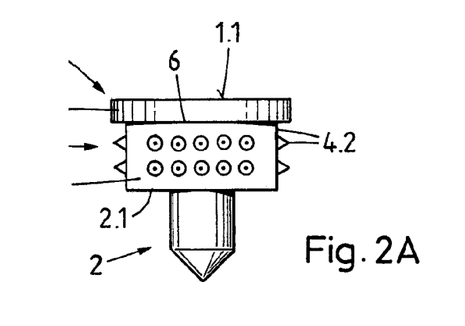
FIG. 2A is an elevation view of the joining element.
Figure 2B:
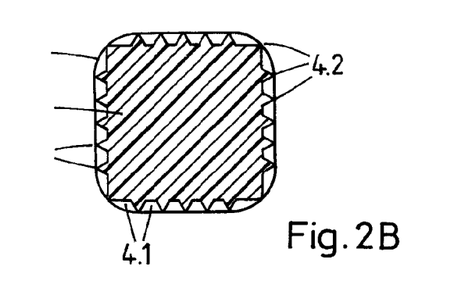
FIG. 2B is cross sectional plan view of the wall anchoring portion.
Figures 2B, 3A:
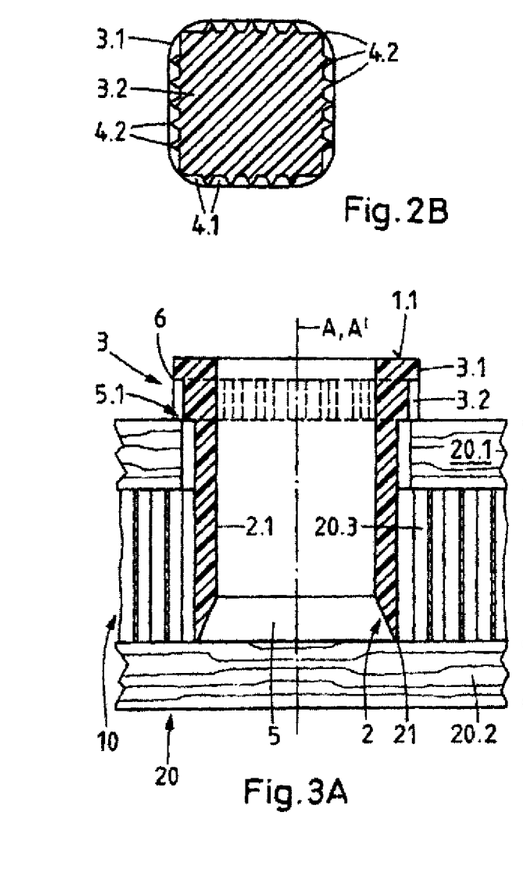
FIG. 3A is a plan view illustrating a hollow core board before the anchoring process.
Figure 2C:
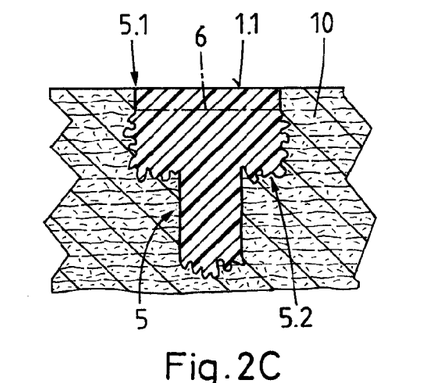
FIG. 2C is a elevation view of the joining element being anchored in an opening provided in the object.

The cross section of the mouth 5.1 and the sealing portion 3.1 are not round (see also FIGS. 2A to 2C).

The sealing portion 3.1 has a considerably smaller axial length and the joining element is to be forced into the opening 5 until the contact face 1.1 or a proximal face is flush with the surface of the board 10.

The sealing portion 3.1 does not extend to the proximal end of the joining element and the region of the proximal end 1 is designed as a fitting to be attached to the board 10 or a means for fixing such a fitting.

The energy concentrating elements 4.2 of the wall anchoring portion 3.2 are not axially extending ribs, but differently oriented ribs or hump-shaped elements (see also FIGS. 2A and 2B).

The joining element does not consist fully of the thermoplastic material, but comprises a core made of e.g. a metal.

Figure 3A:
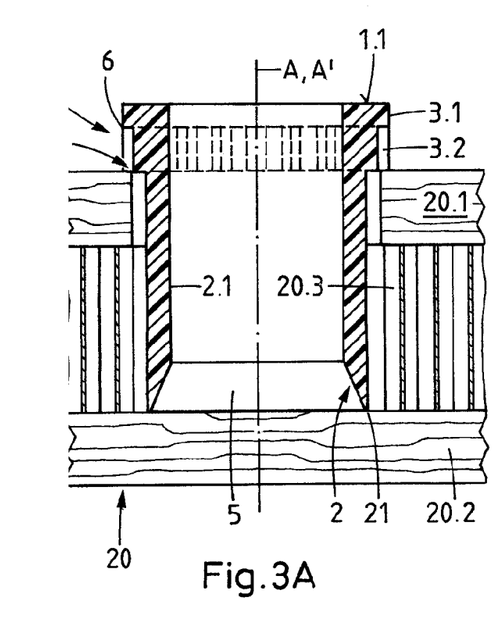
Figure 3B:
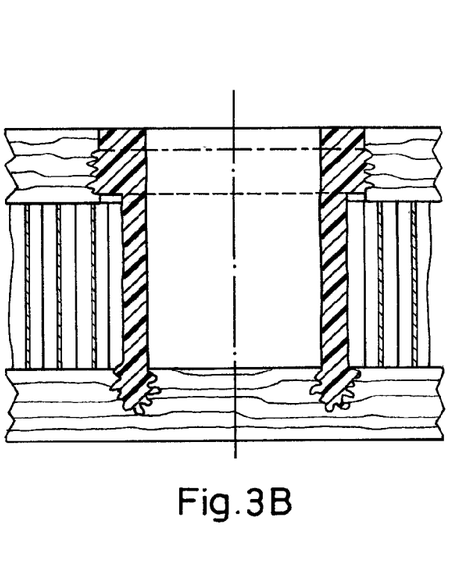
FIG. 3B is a plan view illustrating the hollow core board after the anchoring process.
Figure 4:
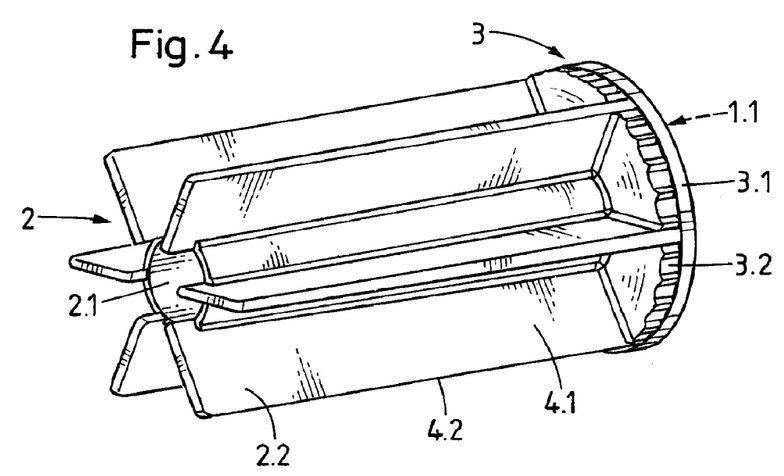
FIG. 4 is a perspective view illustrating a further exemplary embodiment of the joining element according to the invention.

The joining element is hollow (see also FIGS. 3A, 3B and 4).

The object in which the joining element is anchored is not a wooden board 10 or a chip board but consists of another porous material (e.g. concrete, sand stone, metal foam, sintered ceramic or sintered metal) or it consists of a non-porous material and comprises, at least on the walls of the opening 5, surface structures suitable for being interpenetrated by the liquefied thermoplastic material of the joining element.

The opening 5 reaches right through the board.

The axis A' of the opening 5 is oriented at an angle other than a right angle relative to the surface of the board 10 and the border line 6 of the joining element lies in a plane at a same angle relative to the joining element axis A.

Finally, the surface of the object in which the opening is provided is not even but, curved and the border line 6 is similarly curved.

FIGS. 2A to 2C illustrate in the same manner as FIGS. 1A to 1C, a further exemplary embodiment of the joining element according to the invention and the anchorage thereof in an opening 5 provided in an object, e.g. in a wooden board 10. As mentioned already further above, the joining element according to FIGS. 2A to 2C comprises a cylindrical mouth region 3 with a substantially square cross section (without sharp corners), the energy concentrating elements 4.2 of the circumferential surface of the wall anchoring portion 3.2 of the mouth region 3 are on the one hand humps tapering off to a tip and on the other hand, sharp edges of the square cross section forming axially extending ribs. The region of the proximal end 1 of the joining element consists substantially of a contact face 1.1 only, which contact face 1.1 terminates the sealing portion 3.1, which has an axial length of at least 0.5, preferably at least 1 mm. The joining element is forced into the opening 5 to a depth such that the contact face 1.1 is flush with the surface of the object in which the opening 5 is provided.

The region of the distal end 2 of the joining element according to FIGS. 2A to 2C comprises a step-like reduction 2.1 in cross section which is adapted to a similar step 5.2 in the opening 5. This results in anchorage not only in the wall of the opening 5 in the vicinity of the mouth 5.1 but also on the step 5.2 and possibly also on the bottom of the opening 5.

FIGS. 3A and 3B illustrate a further embodiment of the joining element according to the invention and anchorage thereof in a hollow core board 20. Both FIGS. 3A and 3B are axial sections wherein FIG. 3A shows the joining element before being forced into the opening 5 while being vibrated and FIG. 3B thereafter.

The hollow core board 20 comprises a first outer layer 20.1 of e.g. wood, a second outer layer 20.2 of e.g. wood and a middle layer 20.3 consisting e.g. of a cardboard honeycomb. The first and second outer layers 20.1, 20.2 have a thickness of 3 mm, the middle layer 20.3 of 32 mm. The bore 5 penetrates the first outer layer 20.1 and the middle layer 20.3. The joining element is to be anchored in the walls of the opening in the first outer layer 20.1 and preferably on the inner surface of the second outer layer 20.2. The joining element comprises a central tube 2.1 reaching to the distal end 2 of the joining element. Within the central tube 2.1 an inner metal core piece (not shown) may be arranged having an inner thread for fixing a further object on the hollow core board 20.

The joining element again comprises a cylindrical sealing portion 3.1 and a corresponding wall anchoring portion 3.2 which together form a collar on the central tube 2.1. The sealing portion 3.1 has an axial extension of 1 mm and the wall anchoring portion 3.2 has an axial extension of 2.5 mm and its circumferential surface is equipped with recesses and axially extending ribs between the recesses, wherein the depth of the recesses is at least 0.2, preferably 0.3 mm.

The central tube 2.1 has a smaller diameter than the mouth region 3 and tapers off to an edge 21 constituting the distal end 2 of the joining element.

The joining element according to FIGS. 3A and 3B is positioned in the mouth of the bore 5, wherein the dimensions of the joining element and the bore 5 are matched such that the wall anchoring portion 3.2 sits on the mouth 5.1 when the joining element is positioned but can be forced into the mouth 5.1 on application of vibration and force parallel to the axis A, and such that the edge 21 touches the inner surface of the second outer layer 20.2, when the joining element is positioned. The joining element is then forced into the opening 5, wherein the thermoplastic material is liquefied in the area of the edge 21 anchoring the joining element in the second outer layer 20.2 of the hollow core board 20 and in the area of the wall anchoring portion 3.2 anchoring the joining element in the walls of the opening through the first outer layer 20.1 of the hollow core board 20.

For guiding the joining element and for enhancing anchorage in the second outer layer 20.2, a blind or through bore may be provided therein, the axis of such bore being aligned with the axis of the bore in the first outer layer 20.1.

The joining element is forced into the opening 5 until the contact face 1.1 thereof is flush with the outer surface of the first outer layer 20.1 of the hollow core board 20, i.e. until the border line 6 is situated at 1 mm inside the mouth. Experiments show that on removal of the vibrating tool from the contact face 1.1, the contours of the joining element and of the mouth as seen from the outer surface of the first outer layer 20.1 of the hollow core board 20 are not blurred at all, but are as clear cut as before the anchoring process.

The hollow core board 20 according to FIGS. 3A and 3B comprises a middle layer 20.3 comprising e.g. a honeycomb structure of card board. Other known middle layers of similar hollow core boards are foamed plastics and other similar materials. However, it is advantageous also to use the joining elements as sole spacers between the first and second outer layers 20.1 and 20.2 such that the middle layer 20.3 is constituted by nothing more than a plurality of such joining elements. If the board is relatively small all the joining elements may be positioned in locations where further objects (e.g. fittings, hinges, other hollow core boards) are to be fixed on the board. If the board is larger, it is advantageous to provide more joining elements, wherein some of the joining elements serve solely as spacers.

For manufacturing a hollow core board 20 whose middle layer 20.3 is constituted solely by joining elements as described above, prior to introduction and anchoring of the joining elements corresponding openings through the first outer layer 20.1 are to be provided and the two outer layers 20.1 and 20.2 are to be positioned at the desired distance from each other.

A hollow core board 20 whose middle layer 20.3 is constituted solely by joining elements as described further above may be used as a table top, wherein at locations at which the table legs are to be attached to the underside of the table top, the hollow core board 20 comprises joining elements being equipped with means for attaching the legs, e.g. with inner threads into which a treaded bolt can be screwed or with a suitable inner opening into which a corresponding protrusion of the table leg can be glued. Depending on the stiffness of the outer layers 20.1 and 20.2 of the hollow core board 20 forming the table top, on the locations of the leg attachment and on the overall size of the table top, additional inserts may be provided at other locations than the leg attachment locations or not.

FIG. 4 shows a last exemplified embodiment of the joining element according to the invention. The same as the joining element according to FIGS. 3A and 3B, the joining element according to FIG. 4 is particularly suitable for being anchored in the two outer layers 20.2, 20.3 of a hollow core board 20 such that the contact face 1.1 constituting the proximal end of the joining element is flush with the outer surface of the first outer layer of the hollow core board 20. The region between the wall anchoring portion 3.2 and the distal end 2 comprises a central tube 2.1 and radial wings 2.2 extending radially into the recesses of the wall anchoring portion 3.2 and reaching axially beyond the distal end of the central tube 2.1 and having a thickness which gets smaller towards the distal end. The sealing portion 3.1 together with the wall anchoring portion 3.2, whose circumferential surfaces are equipped in the same manner as described above for the joining element according to FIGS. 3A and 3B form together a collar on the central tube 2.1 and cover the wings 2.2 leaving the proximal end of the central tube 2.2 open.

When the joining element according to FIG. 4 are anchored in a hollow core board 20 as substantially described in connection with FIGS. 3A and 3B, a further object can be fixed to the hollow core board 20 by suitable means fitting into the central tube 2.1 of the joining element. It is also possible to use the proximal opening of the central tube for introducing a corresponding protrusion on a distal face of a vibrating tool and therewith enabling guidance of the joining element into the opening by the tool.

The joining element according to FIG. 4 proves to be able to be anchored in a hollow core board 20 with a pull-out resistance which is in relation to the amount of material in the joining element superior to other joining element forms.

Figure 6:
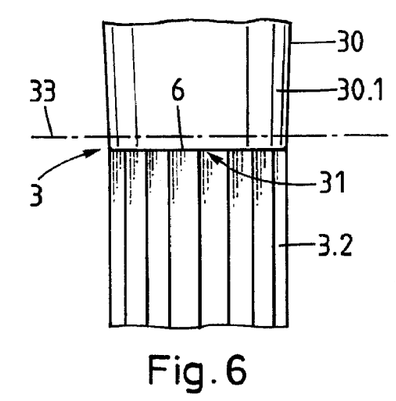
FIG. 6 is an elevation view illustrating the joining element and tool for carrying out the method according to the invention.
Figure 7:
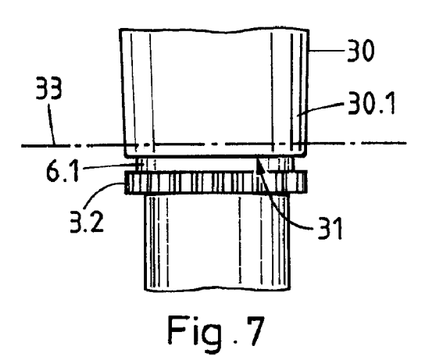
FIG. 7 is an elevation view illustrating the joining element and tool for carrying out the method according to the invention.

As mentioned already at the beginning, in addition to the embodiments in which the sealing portion 3.1 is part of the joining element as shown in FIGS. 1 to 4, it is also possible to carry out the method according to the invention with a joining element whose wall anchoring portion forms the proximal end and with a tool whose distal end is formed for the function of the sealing portion. Such embodiments of the method according to the invention are illustrated in FIGS. 6 and 7. For a comparison, FIG. 5 illustrates in the same manner the method in which a joining element with sealing portion is used.

A tool 30 to be used in the method according to the invention is e.g. a sonotrode of an ultrasonic device, and comprises a distal face 31 adapted to the contact face of the joining element in a per se known manner and suitable for a smooth transfer of the vibration from the tool 30 into the joining element and for coupling a force from the tool 30 into the joining element.

Figure 5:
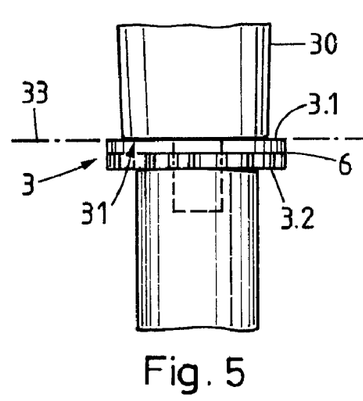
FIG. 5 is an elevation view illustrating a joining element and tool for carrying out the method according to the invention.

According to FIG. 5, the joining element comprises in the above described manner a sealing portion 3.2 and a wall anchoring portion 3.1 which meet along a border line 6 in a mouth region 3 of the joining element. As the above described sealing function is taken over by the sealing portion 3.2 being part of the joining element, the distal face of the tool 30 does not need to have the same form and size as the proximal face of the joining element. It may be smaller as shown in FIG. 5.

According to FIGS. 6 and 7, the sealing function is taken over by a distal (or sealing) portion 30.1 of the tool 30, which for being suitable for the sealing function needs to be formed as discussed further above for the sealing portion 3.1 of the joining element. According to FIG. 6, the distal face 31 of the tool 30 is positioned against the proximal end of the wall anchoring portion 3.2 of the joining element. The joining element and the tool 30 are to be forced into the opening until the border line 6 between the joining element or its wall anchoring portion 3.2 respectively and the tool 30 has reached a position beyond the mouth. This means that on removing the tool 30, the proximal face of the joining element is positioned not flush with the object surface 33 but slightly deeper in the opening (at least about 0.5 mm). The same applies to the method as illustrated in FIG. 7 with the difference that, in analogy to the embodiment shown in FIG. 1E, a narrow border groove 6.1 is provided between the wall anchoring portion 3.2 and the distal or sealing portion 30.1 of the tool 30, the groove portion being part of the joining element and carrying the proximal face of the joining element. For being suitable for carrying out the sealing function, the distal face 31 of the tool 30 needs to be larger than the portion of the groove by the groove depth.

Suitable thermoplastic materials for the joining element are e.g. ABS (acrylonitrile butadiene styrene), PA (polyamide), ASA (acrylonitrile styrene acrylate) or PS (polystyrene).

The invention claimed is:

1. A method for anchoring a joining element in an object with the aid of a thermoplastic material and mechanical vibration, the method comprising the steps of:
    providing an opening in the object, the opening having a mouth situated in a surface of the object and a cylindrical or slightly conical wall extending away from the mouth,
    providing a joining element with a proximal end and a distal end being distanced from each other along an axis, the proximal end being equipped with a contact face which is suitable for being contacted with a vibrating tool for applying, to the joining element, mechanical vibration and a pressing force, the joining element comprising between the proximal end and the distal end a substantially cylindrical or slightly conical wall anchoring portion with a circumferential surface, which comprises the thermoplastic material and is equipped with energy directors in the form of ribs or humps,
    providing a cylindrical or slightly conical sealing portion having a smooth circumferential surface, which sealing portion is positionable coaxially on a proximal side of the wall anchoring portion with a border line or a border groove therebetween,
    wherein a cross section of the sealing portion is an envelope of a cross section of the wall anchoring portion and wherein the cross section of the sealing portion has a form corresponding to the form of a cross section of the mouth and is larger than the latter such that it can be forced into the mouth resulting in a press fit,
    positioning a distal end of the wall anchoring portion into or onto the mouth and with the sealing portion on a proximal end of the wall anchoring portion and forcing the wall anchoring portion and at least a distal part of the sealing portion through the mouth by applying mechanical vibration and a force parallel to the joining element axis, whereby the thermoplastic material on the circumferential surface of the wall anchoring portion is at least partly liquefied and pressed into the walls of the opening and wherein the liquefied material is prevented from exiting through the mouth by the sealing portion.

2. The method for anchoring the joining element according to claim 1, wherein the cross section of the sealing portion is on all sides 0.1 to 1 mm larger than the cross section of the mouth.

3. The method for anchoring the joining element according to claim 1, wherein the wall anchoring portion and the sealing portion are forced into the opening until the border line or border groove has reached a position at least 0.5 mm beyond the mouth.

4. The method for anchoring the joining element according to claim 1, wherein the sealing portion is part of the joining element.

5. The method for anchoring the joining element according to claim 4, wherein the joining element is designed such that the joining element can be forced into the opening until a proximal face thereof is flush with a surface of the object, in which the opening is provided.

6. The method according to claim 4, wherein the joining element comprising the sealing portion consists fully of the thermoplastic material.

7. The method according to claim 4, wherein the sealing portion constitutes the proximal end of the joining element.

8. The method according to claim 7, wherein an axial extension of the sealing portion is between 0.5 and 2 mm.

9. The method according to claim 7, wherein the joining element further comprises a central tube, wherein the sealing portion and the wall anchoring portion form together a collar around the central tube.

10. The method according to claim 9, wherein the joining element further comprises, in an area of the distal end, a plurality of radial wings are attached to the central tube which wings protrude beyond the central tube at the distal end of the joining element.

11. The method for anchoring the joining element according to claim 1, wherein the wall anchoring portion forms the proximal end of the joining element and the sealing portion is arranged on a distal end of the tool used for applying the vibration and force to the joining element.

12. The method for anchoring the joining element according to claim 1, wherein the wall anchoring portion and a portion of the border groove form the proximal end of the joining element and wherein the sealing portion is arranged on a distal end of the tool used for applying the vibration and force to the joining element.

13. The method for anchoring the joining element according to claim 1, wherein the object comprises a porous material or the opening comprises walls with a surface structure suitable to form a positive fit connection with the thermoplastic material.

14. The method for anchoring the joining element according to claim 1, wherein the object is a hollow core board comprising a first and a second outer layer and a middle layer, wherein the opening penetrates the first outer layer and the middle layer, wherein the wall anchoring portion of the joining element has an axial extent which is smaller than a thickness of the first outer layer, and wherein a distance between the distal end of the joining element and a distal end of the wall anchoring portion is matched to a thickness of the middle layer such that the joining element is anchored in addition in the second outer layer.

15. The method for anchoring the joining element according to claim 14, wherein the sealing portion is part of the joining element and wherein an axial extent of the sealing portion and the wall anchoring portion together are substantially the same as a thickness of the first outer layer of the hollow core board.

16. The method for anchoring the joining element according to claim 14, wherein the two outer layers of which one comprises the openings are positioned at an appropriate distance from each other and a plurality of joining elements are anchored in the outer layers such that the middle layer of the resulting hollow core board is constituted solely by the joining elements.

17. The method according to claim 1, wherein the thermoplastic material has an elasticity module of at least 0.5 GPa.

18. The method according to claim 1, comprising recesses between the ribs or humps, the recesses having a depth of at least 0.2 mm.

* * * * *

UNITED STATES PATENT AND TRADEMARK OFFICE
CERTIFICATE OF CORRECTION

PATENT NO. : 7,765,672 B2
APPLICATION NO. : 11/962292
DATED : August 3, 2010
INVENTOR(S) : Clinch et al.

It is certified that error appears in the above-identified patent and that said Letters Patent is hereby corrected as shown below:

In Column 10, Line 15, in Claim 1, after "mouth" delete "and"

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

Page 1 of 2

PATENT NO. : 7,765,672 B2
APPLICATION NO. : 11/962292
DATED : August 3, 2010
INVENTOR(S) : Colin Clinch et al.

It is certified that error appears in the above-identified patent and that said Letters Patent is hereby corrected as shown below:

In the Drawings

Please replace sheet 2 of 3 of the drawings with the attached Replacement Sheet.

Signed and Sealed this
Twenty-ninth Day of April, 2014

Michelle K. Lee
*Deputy Director of the United States Patent and Trademark Office*